United States Patent Office 3,436,420
Patented Apr. 1, 1969

3,436,420
PROCESS OF MAKING ALIPHATIC AMINES
Zdzislaw F. Dudzinski, Clifton, N.J., assignor to Millmaster Onyx Corporation, New York, N.Y., a corporation of New York
No Drawing. Filed May 2, 1967, Ser. No. 635,357
Int. Cl. C07c 85/04
U.S. Cl. 260—583                              3 Claims

ABSTRACT OF THE DISCLOSURE

A process for making either primary, secondary or tertiary amines by reacting either ammonia, a primary amine or a secondary amine with a monochlorinated hydrocarbon having the chlorine attached to the penultimate carbon atom and derived from a hydrochlorinated alpha olefin, the reaction being effected in a solventless environment at a temperature of about 140° to 160° C. and a pressure of about 285 to 400 p.s.i.

---

This invention relates to an improved process for the preparation of aliphatic amines from monochlorinated linear, saturated hydrocarbons having from 10 to 34 carbon atoms and having the chlorine radical attached to the penultimate carbon atom, and it, particularly, relates to a process of this type wherein the amination is effected in a solventless environment.

It was heretofore believed that the preferable method for aminating monochlorinated hydrocarbons was to carry out the amination in a solvent such as water or a hydroxyl-bearing organic solvent. It was not believed possible to obtain sufficiently satisfactory results without such solvents. It has now, however, been unexpectedly discovered that if the reaction is effected, at certain temperature and pressure conditions, without a solvent, not only are the results satisfactory, but that they are far superior to the results obtained when using a solvent. In this respect, not only is the yield significantly increased, but the process is greatly simplified because it obviates the necessity of using additional treating steps such as acidification, initial extraction, neutralization, and final extraction. The elmination of these steps not only expedites the process but also decreases the amount of labor and equipment and, therefore, substantially decreases the cost.

The yield is even further increased when the solventless amination process is preceded by hydrochlorination of the alpha olefin by means of incremental conversion at relatively low temperatures.

The following examples are illustrative of the present invention, it being understood, however, that they are not intended to limit the invention, except as claimed. In this respect, it is to be noted that although the examples utilize dimethylamine as a reactant, other secondary amtines can be substituted in the identical process. Furthermore, the identical process can be used except for the substitution of ammonia or a primary amine for the secondary amine, the only difference being that the use of ammonia will result in a primary amine and the use of the primary amine will result in a secondary amine.

Example 1

About 1680 gms. of dodecene-1, containing about 6% by weight of branched chain olefin, plus about 350 mgms. of anhydrous ferric chloride, as a catalyst, were used in the reaction. About 10% by weight of this mixture was initially charged, at room temperature and pressure, into a flask equipped with a dropping funnel, a thermometer, a protected outlet and an absorber for excess HCl gas. Agitation was maintained throughout the reaction.

The temperature was then increased to 55° C., at which time the HCl gas was passed into the flask. The remainder of the dodecene-1 was then added slowly throughout a period of 4 hours while the temperature was maintained at about 55° C. The reaction was complete at the end of the 4 hour period.

The product was then first washed with water and then with a 5% sodium carbonate solution, after which it was filtered and dried in vacuo at 50°–60° C. An assay for organically combined chlorine indicated that the reaction was 99.5% complete, and that residual unsaturation, as determined by bromine number, was negligible. The product was identified as 2-chlorododecane.

Under the conditions of this example, the migration of the double bond to other than the alpha form was strictly minimized, both because of the considerably lower reaction temperature than used in prior processes and because of the gradual addition of the olefin to the reaction mass.

Instead of 1-dodecene, other alpha olefins may be used in the same process. Such other olefins include 1-decene, 1-tetradecene, 1-hexadecene, 1-octadecene, 1-eicosene and 1-tetratriacontene, etc. Also utilizable are 1-undecene, 1-tridecene, 1-pentadecene, 1-heptadecene, etc., such as may occur, for example, in the products of cracked wax.

Example 2

One mol of the 2-chlorododecane produced in Example 1 was charged into a pressure vessel with a 5-mol ratio quantity of dimethylamine. The mixture was then heated, at a temperature of about 155° C. and a pressure of about 300 to 400 p.s.i., for an extended period until assay indicated the end point of the reaction, at about 90% of theory, as 2-dimethylamino dodecane hydrochloride. The amine hydrochloride was then neutralized with sodium hydroxide and stripped of dimethylamine. The product was then separated from the brine, and filtered to clarify it. On distillation, the product was obtained in 85% overall yield as 2-dimethylamino dodecane. This corresponds to 95% of the assayed quantity.

This product was utilizable, without further purification, for such purposes as the preparation of quaternary ammonium salts, tertiary amine oxides, amphoteric surface active agents, and the like.

Example 3

One mol of crude dry 2-chlorododecane, prepared in the manner of Example 3 of U.S. Patent No. 3,287,411, was used in the same process as in Example 2 above. The conversion was about 90% of the theoretical of 2-dimethylamino dodecane and this assayed about 85% of that value, or about 76% overall yield after distillation to remove impurities.

This product too, after being neutralized with sodium hydroxide, stripped of dimethylamine, separated from the brine, and then filtered to obtain greater clarification, was utilizable as in intermediate, without further purification, for the same purpose as the product of Example 2.

It is to be noted that the temperature of the reaction should be lower than heretofore generally used, namely, between 125° and 160° C., although the range of 150 to 155° C. is preferred. On the other hand, the pressure should be between about 285 to 400 p.s.i., preferably about 300 to 400 p.s.i. Furthermore, when using the incremental conversion process of the olefin, such as disclosed in Example 1, the temperature of the reaction should be no greater than 80° C. and, preferably, in the range of 50° to 60° C.

The invention claimed is:
1. The method of making an aliphatic amine from a monochlorinated aliphatic linear saturated hydrocarbon containing 10 to 34 carbon atoms and having the chlorine radical attached to carbon atom number 2 which comprises reacting said monochlorinated hydrocarbon with a base selected from the group consisting of ammonia, as aliphatic primary amine and as aliphatic secondary amine, in the absence of a solvent, and at a temperature of between about 125° and 160° C. and a pressure of between about 285 and 400 p.s.i.

2. The method of claim 1 wherein the monochlorinated hydrocarbon is obtained by hydrochlorination of an alpha olefin by means of incremental conversion of said olefin at a temperature of between about 50° to 80° C., said incremental conversion comprising the incremental addition of the major portion of the olefin to the reaction mass after the reaction temperature has been reached.

3. The method of claim 1 wherein the monochlorinated hydrocarbon is a member of the group consisting of 2-chlorodecane, 2-chlorododecane, 2-chlorotetradecane, 2-chlorohexadecane, 2-chlorooctadecane, 2-chloroeicosane, 2-chlorotetratriacontane, 2-chloroundecane, 2-chlorotridecane, 2-chloropentadecane and 2-chloroheptadecane.

References Cited
UNITED STATES PATENTS

| | | |
|---|---|---|
| 2,640,080 | 5/1953 | De Tar et al. |
| 3,169,995 | 2/1965 | Roy et al. _____ 260—583 |
| 3,287,411 | 11/1966 | Wakeman et al. |

CHARLES B. PARKER, *Primary Examiner.*

R. L. RAYMOND, *Assistant Examiner.*

U.S. Cl. X.R.

260—585